United States Patent [19]

Lindskog

[11] Patent Number: 4,536,364
[45] Date of Patent: Aug. 20, 1985

[54] MANUFACTURE OF TWO PART MOLD

[76] Inventor: Kjell J. Lindskog, Floravägen 27, S-931 00 Skellefteå, Sweden

[21] Appl. No.: 574,098
[22] PCT Filed: Apr. 29, 1983
[86] PCT No.: PCT/SE83/00171
 § 371 Date: Dec. 21, 1983
 § 102(e) Date: Dec. 21, 1983
[87] PCT Pub. No.: WO83/03792
 PCT Pub. Date: Nov. 10, 1983

[30] Foreign Application Priority Data

Apr. 30, 1982 [SE] Sweden ............................. 8202745

[51] Int. Cl.³ ........................... B29C 1/02; B28B 7/34
[52] U.S. Cl. .................................... 264/227; 249/134; 264/226; 264/338
[58] Field of Search ............... 264/2.5, 220, 225, 226, 264/227, 219, 338; 249/112, 134

[56] References Cited

U.S. PATENT DOCUMENTS

| | | | |
|---|---|---|---|
| 3,065,511 | 11/1959 | Leitzel | 164/45 |
| 3,683,722 | 8/1972 | Pears | 264/225 |
| 3,770,690 | 11/1973 | Oswitch | 260/37 |
| 3,773,879 | 11/1973 | Munsil et al. | 264/225 |
| 3,959,871 | 6/1976 | Reback | 264/225 |
| 4,231,982 | 11/1980 | Jansson | 264/112 |

Primary Examiner—James Lowe
Assistant Examiner—Mary Lynn Fertig
Attorney, Agent, or Firm—Sughrue, Mion, Zinn, Macpeak, and Seas

[57] ABSTRACT

A mould part which is intended to be brought together with at least one other mould part, to form a closed mould cavity in which plastics objects can be shaped. The mould part comprises a composite mould body which includes a support section (10) made of rigid material and having a surface whose shape corresponds to the shape of the object to be formed, and a mould shell (2,3,4) which is detachably arranged on said surface and which is suitably made from a plastics material having an extremely fine surface which serves as the moulding surface. The mould shell can be readily replaced, at low cost, with a new mould shell, after having been in use for a given length of time. The invention also relates to a method for manufacturing mould parts in accordance with the above, and to the use of such mould parts.

4 Claims, 4 Drawing Figures

MANUFACTURE OF TWO PART MOLD

TECHNICAL FIELD

The present invention relates to a mould part which is intended to be brought together with at least one other mould part, to form a mould cavity for shaping plastics articles and objects. The present invention also relates to a method in the manufacture of such a mould part, and to a method in the manufacture of shaped, plastics articles and objects while using said mould part.

BACKGROUND ART

Such objects as the hulls of boats, cisterns, car-body components, and other similar objects are being made to an ever increasing extent from fibre-reinforced plastics materials, and particularly from polyester resin reinforced with glass-fibre. The normal method of manufacture is one in which the fibre-reinforcement and the plastics material are placed in layers on a mould, whereupon the plastics material is pressed into the fibre-reinforcement with the aid of a roller, or corresponding device for moistening the reinforcement throughout and for removing air inclusions. In an alternative method, plastics material containing chopped reinforcing fibres is injected, under high pressure, directly into the mould cavity, until a layer of the desired thickness is obtained.

Both of these methods represent serious health hazards especially when using polyester resins which contain harmful styrenes, these styrenes being released during the moulding process, to mix with the air in the workshop. Attempts have been made to overcome this problem, by installing powerful ventilating systems. Among other things, this has proved to be relatively expensive, since in addition to the costs involved in the actual ventilating apparatus, heating costs are also increased. In addition to costs, such systems create irritating noise and raise the level of draughts in the workshop.

In order to solve these problems, and in an effort to increase output, attempts have been made to manufacture products of the aforementioned kind in closed moulds from which gases can be readily removed, so as not to contaminate the air in the workshop. In the case of moulded shells, the moulds comprise a female mould-section and a male mould-section, the latter being brought into the female mould-section to a position in which the distance between the male and female sections of the moulds correspond to the desired thickness of the objects being produced. In one method of procedure, the plastics material is poured into the female mould-section and there subjected to pressure, in conjunction with the insertion of the male section of the mould. Alternatively, a sub-pressure can be created in the female mould-section and the plastics material drawn into the mould cavity as a result thereof, or the plastics material can be forced into the mould cavity by application of an external overpressure.

In order to obtain male and female mould-sections of satisfactory rigidity, surface fineness, and wear durability, the sections must be made of steel. Steel moulds, however, are excessively expensive when intended for manufacture in small series or for the manufacture of large objects, such as the hulls of canoes or dinghies.

OBJECT OF THE INVENTION

The main object of the present invention is to provide moulds and methods of manufacture which can be applied in the rational, closed manufacture of reinforced plastics articles and objects, including small-series manufacture and the manufacture of large objects, while avoiding the aforementioned disadvantages.

BRIEF SUMMARY OF THE INVENTION

This object is achieved in accordance with the invention by using composite moulds which include a rigid support part made of an inexpensive material and having a surface shaped to correspond to the shape of the objects to be moulded, and by detachably arranging on said surface a mould shell having an extremely fine surface which serves as the moulding surface.

The mould shell can either be bonded to the support part, using a plastics bonding agent, in a manner to be readily separated therefrom, or can be held to said support section by, for example, suction or by means of co-acting snap-means.

The mould shell and the support part can be manufactured with the aid of a model of the object to be formed, said model, when manufacturing the mould shell from a plastics material, first being coated with a gel-coating. In accordance with the invention, it has been found that a waxed gel-coating is well suited as a moulding surface when shaping reinforced plastics products. Alternatively, a metal shall can be sprayed onto the model, or the model can be used to mould a sheet-metal shell. The disadvantage with both plastics and metal shells, however, is that the resultant surface can only be used for producing a limited number of objects, due to wear on said surface. This problem is solved in accordance with the present invention by arranging said mould shell in a manner which enables it to be readily removed from the support section, as beforementioned, so as to enable said mould shell to be replaced with a new, relatively inexpensive shell when the need arises.

The support section can be manufactured from a suitable, inexpensive filler material, which is mixed with resin and allowed to harden to an extremely rigid state.

The special characteristic features of the various aspects of the present invention are disclosed in the following claims.

The invention will now be described in more detail with reference to the accompanying, schematic drawings.

DESCRIPTION OF A PREFERRED EMBODIMENT OF THE INVENTION

Figure 1:
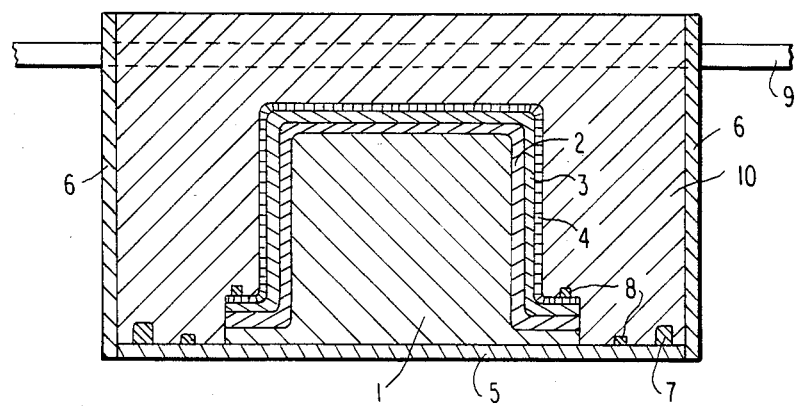
FIG. 1 is a sectional view of a model and a female mould-section constructed thereupon.

With reference to the Figures, it is assumed that an elongate, substantially U-shaped shell is to be moulded from a reinforced plastics material. In this respect, there is shown in FIG. 1 a rigid model 1 having a surface whose shape conforms to the object being moulded. In accordance with the invention, a female mould-section adapted to the model is manufactured in the following manner. Firstly, a gel-coating is applied to the model 1, either with the aid of a brush or by spray. This layer will form the actual moulding surface of the female mould-section. Fibre-reinforced polyester is then applied to the gel-coating in a conventional manner. In the illustrated case, two layers 2, 3, each having a thickness of about 2 mm are applied, in order to obtain the desired thickness and rigidity of the ultimate mould shell. The polyester should be heat resistant, and able to withstand temperatures of at least 100° C. In the illustrated embodiment, a thin layer 4 of polyester, having a thickness of about 0.5 mm, is applied to the outermost layer of layers 2, 3, for a reason hereinafter made apparent. The outer layer is rubbed down and any remaining cracks or crevices filled in, whereafter the surface is waxed and polished and the model, together with the applied layers, is placed on a plate 5, which serves to provide a parting plane and which is provided with walls 6.

A mixture of resin and filler is then prepared, and a gel-coating is applied to the waxed layer 4, either by brush or by spray. A coupling layer of fine filler is optionally brushed onto the gel-coating. The cavity defined by the layer 4, the plate 5 and the walls 6 is then filled with a plastics mixture, which is packed hard and allowed to harden to form an extremely rigid support body 10. The plate 5, with walls 6, and the model 1 are then removed, the result being a female mould-section according to FIG. 2, having an extremely fine inner moulding surface comprising a replaceable mould shell.

Figure 3:
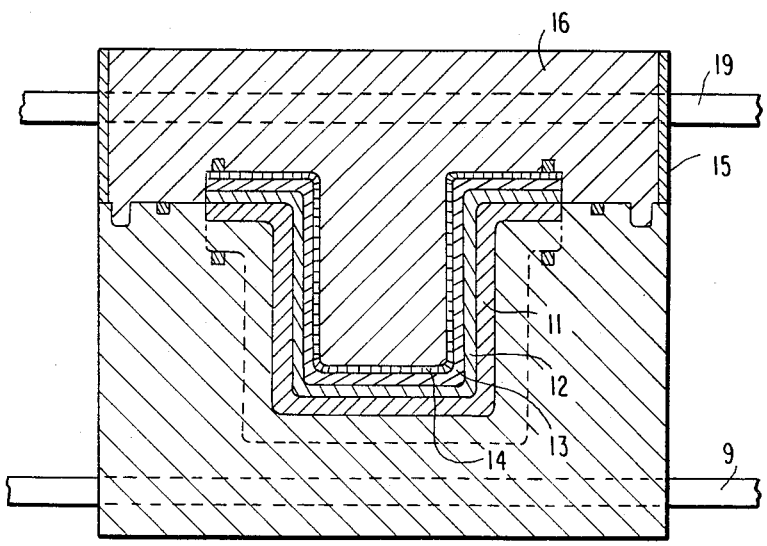
FIG. 3 is a sectional view of the female mould-section and a male mould-section built in said female section.

As schematically illustrated in FIG. 3, the female mould-section produced in accordance with the aforegoing can be used to manufacture a male mould-section which conforms to the female mould-section. In this respect, the steps taken are substantially the same as those previously described with reference to FIG. 1. In this case, however, there is first applied to the waxed moulding surface of the female mould one or more plastics layers 11 having a thickness corresponding to the desired thickness of the object to be formed. The layer 11 is rubbed down, and any remaining cracks or crevices filled in, whereafter the surface is waxed and polished. A gel-coating is then applied, to form the moulding surface of the male mould, to which surface there is applied, for example, two plastics layers 12, 13 each having a thickness of about 2 mm, to obtain the desired thickness of the mould shell. Applied to this layer is a further thin layer of plastics 14, having a thickness of about 0.5 mm. This layer is then rubbed down and any cracks or crevices filled in, whereafter the surface is waxed and polished and a gel-coating applied thereto. Walls 15 are arranged adjacent the support part of the female mould, and the female mould and the space between said walls is filled with a filler which contains a hardening agent. Optionally, a coupling layer of fine filler is first brushed onto the gel-coating.

Figure 4:
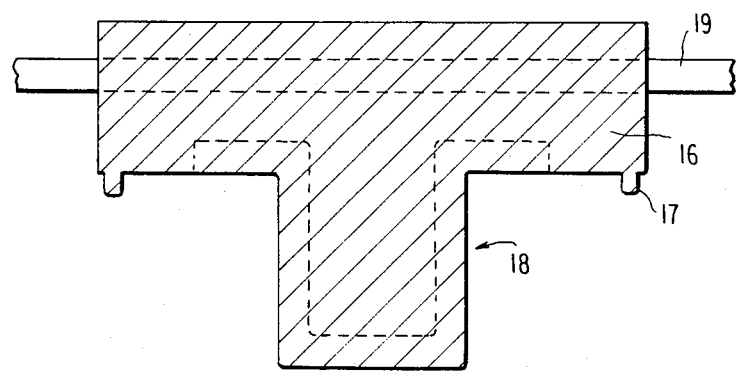
FIG. 4 is a sectional view of the resultant male mould-section with replaceable mould shell.

The mould parts are then separated, there being obtained a male mould, according to FIG. 4, comprising a rigid support body 16 with guides 17, and a male projection 18 having an extremely fine moulding surface in the form of a replaceable mould shell. The layer 11, which corresponds to the desired thickness of the object to be formed, has also been removed, to provide a mould cavity when the male mould is inserted into the female mould.

Figure 2:
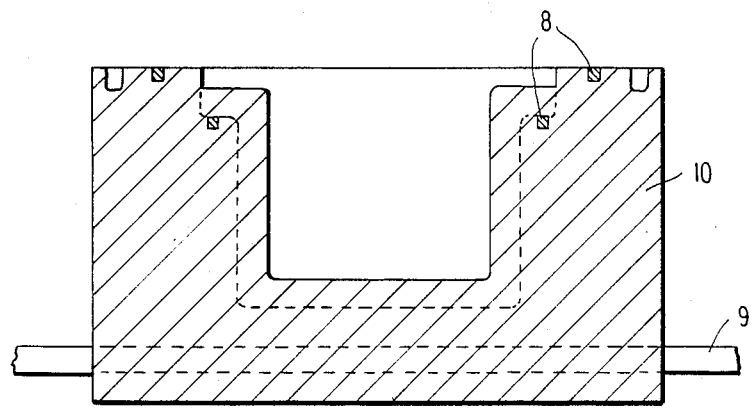
FIG. 2 is a sectional view of the resultant female mould-section with replaceable mould shell, turned through 180°.

When using the two mould halves according to FIGS. 2 and 4, the plastics material to be shaped can either be pressed into said mould cavity, by applying an over-pressure, or can be drawn into said mould cavity, by applying a sub-pressure. Alternatively, the female mould can be filled with a given quantity of plastics material, and the male mould then pressed into the female mould. In this case, the pressure exerted will be taken up by respective support bodies.

Consequently, when applying the aforedescribed method both male and female moulds can be manufactured from relatively inexpensive material, which with respect to rigidity and surface fineness of the moulding surface are comparable with steel moulds. As beforementioned, however, the moulding surface becomes worn, and must therefore be changed subsequent to manufacturing a given number of objects. This can be readily achieved with mould parts according to the invention, since the mould shell comprising layers 2, 3 and 4 of the female mould part and the layers 12, 13 and 14 of the male part of the mould can be prized away, this prizing of said layers being facilitated by the inwardly located, waxed gel-coating. These layers are then replaced with a mould shell which has a thickness corresponding to layers 2 and 3, and 12 and 13 respectively, and which has been manufactured inbetween-times in a corresponding manner. In this respect, the cavity, about 0.5 mm, which corresponds to the thickness of the layers 4 and 14 respectively can be used for introducing a plastics composition for fixing the new mould shell to respective support bodies. Alternatively, the new mould shell can have a thickness corresponding to the thickness of all three layers removed, whereupon the mould shell can be held in place in respective support parts, for example, with the aid of a partial vacuum acting on the mould shell. In this respect, suitable sealing rings are arranged in the grooves formed by the bodies 8 and open towards the shell. When fixing of the shell is effected by means of a vacuum, the layers 4 and 14 respectively may be omitted from the start. The mould shell can also be held in position by means of co-acting snap-fasteners, screws or the like.

Instead of manufacturing a new mould shell separately from the mould tool, the mould shell can be manufactured directly in said tool. In this case, the mould shell to be replaced is first prized away, whereafter the tool is closed around a shell which corresponds to a finished object. A plastics composition is then injected into the cavity obtained in the mould tool, through passages arranged in the support body, the plastics composition then being permitted to harden, to form the new mould shell. The other mould shell can then be replaced in a corresponding manner.

As will be understood from the aforegoing, when practising the present invention the moulding surfaces of the mould parts can be readily replaced at low cost, so that there is constantly obtained objects of the desired surface finish. The described method of manufacturing the mould parts in each other guarantees that their shape in relation to each other will be precisely that desired.

As will be understood, the aforedescribed steps in the manufacture of the mould parts can be reversed, such that the male mould part is manufactured first, and then used to manufacture the female mould part. Similarly, the plastics layer which determines the thickness of the subsequently manufactured object may alternatively be applied to the female mould part.

In the aforegoing it has been assumed that the mould shell is made of a plastics material. The mould shell, however, can also be produced by spraying or electrodeposition of metal onto the model. For example, a thin layer of molten nickel may first be sprayed onto the model. A thicker layer of, for example, an aluminum-zinc alloy can then be applied to the nickel layer. Alternatively, the mould shell may be formed by drawing sheet metal to the desired shape.

Thus, the present invention provides a method of producing fibre-reinforced plastics products which enables the manufacture of such products to be effected rationally in a closed mould cavity, with the use of moulds which can be manufactured at low cost, even when intended for producing large objects. For example, the invention can be applied when manufacturing hulls for dinghies and canoes having a length, for example, of 5.5 m, for which products it would be totally unrealistic, if at all possible, to manufacture a steel mould. Thus, the rate of manufacture of objects whose manufacture has not been possible with the aid of co-acting mould halves, but which has required manual working operations in plastics materials, can be greatly increased when practising the invention.

The invention is not restricted to the aforedescribed and illustrated embodiment, but can be modified in several respects. Thus, it can be applied in the manufacture of products of any selected shape, in which case the mould halves may optionally be divided into co-acting parts. The outer shapes of the mould halves can also be varied as desired, and provided with the guides and/or sealing elements required in the manufacture of the intended object. In order to provide for the heating or cooling of the mould, pipe coils of the desired configuration can be incorporated in the support bodies. Although not illustrated in the drawings, vacuum pipes, injection passages and the like required in the manufacture of a particularly object can also extend through said support bodies.

I claim:

1. A method of manufacturing a set of moulds comprising a male mould and a female mould arranged to be brought together to form therebetween a mould cavity, in which objects can be moulded from a plastics material, wherein a model of the object to be moulded is first produced, said model having one at least partly convex surface whose shape corresponds to the shape of the outer surface of the object to be moulded, using said model for the manufacture of said female mould by forming at least one relatively thin layer of plastics material over the model, which plastics layer will serve as a removable mould shell in the female mould, whereafter a material in a shapeable condition which upon hardening can form a support part for said mould shell of said female mould is supplied to a mould encircling said mould shell, and using the female mould for the manufacture of the male mould, whereat a material layer having a thickness corresponding to the thickness of the object to be moulded is first applied in the female mould to thereby define the dimensions of the mould cavity, said manufacture of the male mould being carried out by coating the layer in the female mould corresponding to the object to be moulded with at least one relatively thin layer of plastics material which plastics layer will serve as a removable mould shell on the male mould, whereafter a material in a shapeable condition which upon hardening can form a support part for said mould shell is supplied to a mould encircling said mould shell, and thereafter separating said female mould from said male mould, removing said material layer having a thickness corresponding to the thickness of the object to be moulded.

2. A method according to claim 1, characterized in that the model is first coated with a gel-coating which is waxed and polished.

3. A method according to claim 1 or 2, characterized in that a gel-coating is applied to each boundary surface between each mould shell and the respective support part.

4. A method of manufacturing a set of moulds comprising a male mould and a female mould arranged to be brought together to form therebetween a mould cavity, in which objects can be moulded from a plastics material, wherein a model of the object to be moulded is first produced, said model having one at least partly convex surface whose shape corresponds to the shape of the inner surface of the object to be moulded, using said model for the manufacture of said female mould by first forming a material layer over the model which layer has a thickness corresponding to the desired thickness of the object to be moulded to thereby define the dimensions of the mould cavity and which layer is then coated with at least one relatively thin layer of plastics material which layer of plastics material will serve as a removable mould shell in the female mould, whereafter a material in a shapeable condition which upon hardening can form a support part for said mould shell of said female mould is supplied to a mould encircling said mould shell, and using the female mould for the manufacture of the male mould, said manufacture of the male mould being carried out by coating the layer in the female mould corresponding to the object to be moulded with at least one relatively thin layer of plastics material which plastics layer will serve as a removable mould shell on the male mould, whereafter a material in a shapeable condition which upon hardening can form a support part for said mould shell is supplied to a mould encircling said mould shell, and thereafter separating said female mould from said male mould, removing said material layer having a thickness corresponding to the thickness of the object to be moulded.

* * * * *